Nov. 6, 1956     B. STAHMER     2,769,715
SLICED CORRUGATED POTATO PRODUCTS
Filed Oct. 21, 1955     2 Sheets-Sheet 1

INVENTOR.
BERNHARDT STAHMER

Nov. 6, 1956  B. STAHMER  2,769,715
SLICED CORRUGATED POTATO PRODUCTS
Filed Oct. 21, 1955  2 Sheets-Sheet 2

INVENTOR.
BERNHARDT STAHMER
BY Woodling & Krost
Atty's.

United States Patent Office 2,769,715
Patented Nov. 6, 1956

2,769,715

SLICED CORRUGATED POTATO PRODUCTS

Bernhardt Stahmer, Omaha, Nebr.

Application October 21, 1955, Serial No. 542,021

3 Claims. (Cl. 99—100)

This invention relates to sliced corrugated potato products and more particularly to sliced corrugated potato products having a new distinctive taste.

The applicant has spent a considerable amount of time, effort and money in developing a new corrugated potato product which is sold under the trademark "Ruffles." This potato product has a new distinctive taste different from all other potato products, namely; potato chips, potato shoestrings, and french fried potatoes. Applicant has discovered that by slicing the potato product with certain specified dimensions and shape, that it will give the potato product a new and distinctive taste. The new potato product tastes as if it might contain cheese although there is no cheese in the product. Applicant is unable to explain why his product has a new distinctive taste from other products. While not being bound by theory, it is well known that if an apple is bruised, within a few minutes after it is bruised, the bruised part tastes differently from the rest of the solid apple. Whether applicant's potato product tastes differently because the potato is bruised by the slicing thereof is not known. At any rate, the applicant's product has a distinctive taste and why it has a taste of that of containing cheese is not known. The product is cooked in the same fashion and with the same cooking medium as that for potato chips, although the taste is entirely different. Accordingly, it is an object of the present invention to produce a potato product having a new and distinctive taste giving a flavor as if it might contain cheese, as well as being crunchy.

Another object of the invention is to so slice a potato with specified dimensions and shape and with corrugations so as to give the new distinctive taste when the sliced potato is cooked in the same manner as a potato chip having both sides smooth is cooked.

In the prior art, potato chips have been made having alternate ridges and grooves disposed in parallelism on both sides of the chip. This chip is generally referred to in the trade as a "wave" chip or a "marcel" chip. This "wave" chip has a taste similar to the Saratoga potato chip; that is, a chip having both sides thereof smooth. This invention is different from a "wave" or "marcel" potato chip. The present application is a continuation-in-part of my co-pending patent application Serial No. 312,191 filed September 30, 1952 for Grooved Potato Chip, now abandoned which application is a continuation-in-part of the application from which Patent No. 2,612,453 issued on September 30, 1952, entitled "Potato Chip Construction."

It is a further object of the invention to provide a potato product having this new taste with the corrugations both in parallelism as well as criss-cross.

Another object of the invention is the provision of a potato product with corrugations on both sides thereof and with a web therebetween, said corrugations and said webs having specific dimensions and shapes as hereinafter disclosed.

Other objects and a fuller understanding of the invention may be had by referring to the following detailed description and claims, taken in conjunction with the accompanying drawing, in which:

The potato product of this invention shown in Figures 1 to 4 is provided with alternate, parallel ridges 10 on one side thereof spaced apart from each other by alternate parallel grooves 12. The ridges 10 and the grooves 12 on the same side of the corrugations are disposed in parallelism and are arcuate in extent.

Figure 1:
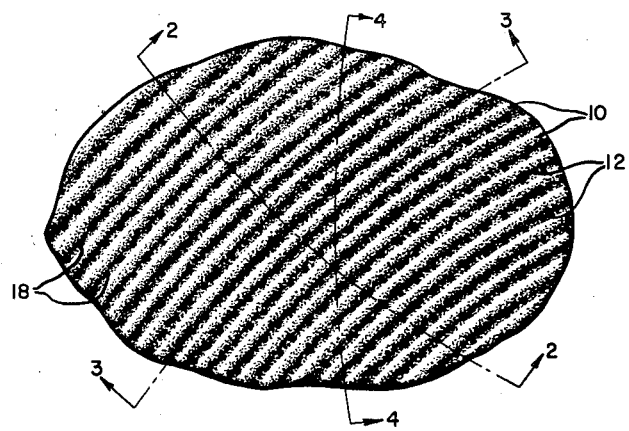
Figure 1 is a top plan view of a potato product of this invention shown after it has been cooked and is ready for eating, the potato product having corrugations on opposite sides thereof criss-crossing each other.
Figure 2:
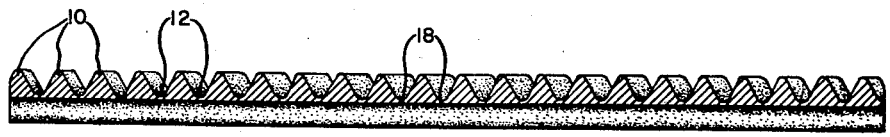
Figure 2 is a sectional view taken along the line 2—2 of Figure 1, the product in Figure 2 being substantially flat as it is previous to cooking.
Figure 3:
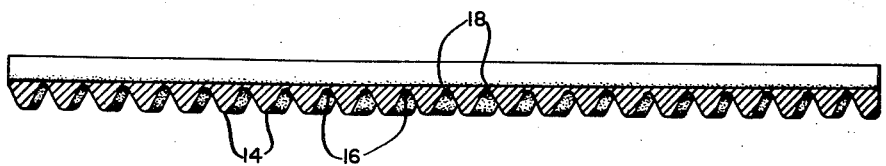
Figure 3 is a sectional view taken along the line 3—3 of Figure 1 prior to cooking.
Figure 4:
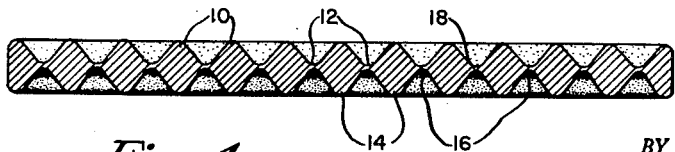
Figure 4 is a sectional view taken along the line 4—4 of Figure 1 prior to cooking.

The opposite side of the product is provided with alternate parallel ridges 14 which are spaced apart by alternate, parallel grooves 16. The ridges 14 and the grooves 16 are also arcuate in extent. The bottom of the grooves 12 and the bottom of the grooves 16 have a thin membrane or web portion 18. In other words, the bottom of the grooves are spaced apart to provide a web and yet retain the distinctive taste and crunchiness. Also the web 18 is such that the potato products do not crumble into dust but in the event that they break, they break along the longitudinal extent of the grooves to provide elongated portions rather than small powdery crumbs. The web 18 further permits the cooking medium to contact a large surface area of the potato product causing the potato to cook more rapidly cooperating with the ridges to provide a thick and crunchy product of a distinctive taste. The grooves 12 and 16 are preferably provided with inclined disposed side walls so that, as best seen in Figure 4, the cooking medium can readily flow over all surfaces during cooking, providing a more efficient and thoroughly cooked product than heretofore.

As illustrated in Figures 1 to 4, the potato product of this invention is manufactured by machine making corrugated cuts across the potato from two specified directions. As a result, the ridges and grooves are arcuate. It is desired that the ridges 10 and the ridges 14 criss-cross each other with a web therebetween at an angle as nearly as possible to 90 degrees as indicated by the angle between the cutting line 2—2 and the cutting line 3—3. Accordingly, the grooves on one side of the potato product of Figure 1 cross the grooves on the other side of the potato product with the web 18 therebetween at substantially right angles.

Figure 5:
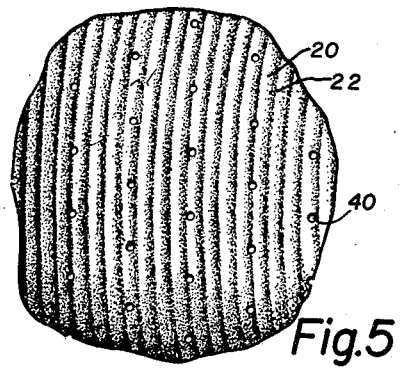
Figure 5 is a top plan view of a modified potato product in that the corrugations on opposite sides thereof are in parallelism.
Figure 6:
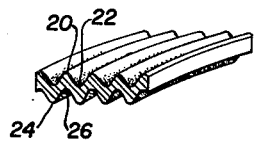
Figure 6 is a fragmentary view partly shown in section of the potato product shown in Figure 5, the corrugations being shown in parallelism and the ridges on one side thereof being in-phase alignment with the grooves on the other side thereof.

In Figure 5, a modified form of the sliced potato product is shown and the modification resides in the fact that the ridges 20 on one side of the potato product and the ridges 24 on the other side of the potato product are arcuate and extend in parallelism on opposite sides of the product. The same is true for the grooves 22 on one side of the potato product and the grooves 26 on the other side of the potato product. This is illustrated clearly in Figure 6. Also in Figure 6, the ridges 20 on one side of the potato product are in in-phase alignment with the grooves 26 on the opposite side of the potato product. This is illustrated by an enlarged view in Figure 8 of the drawing.

Figure 7:
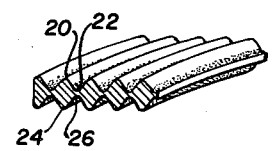
Figure 7 is a modified view of Figure 6 in that the ridges on one side thereof are 180 degrees out-of-phase alignment with the grooves on the opposite sides thereof.
Figure 8:
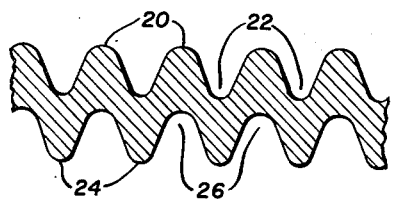
Figure 8 is an enlarged cross-sectional view of a fragmentary portion of the product shown in Figure 5 with the ridges on one side thereof being in-phase with the grooves on the opposite sides thereof, being an enlarged figure of Figure 6.
Figure 9:
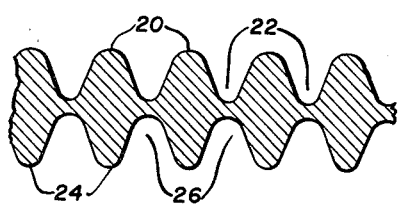
Figure 9 is a view similar to Figure 8 but shows the ridges on one side thereof being 180 degrees out-of-phase with the grooves on the opposite side thereof, being an enlargement of the Figure 7.
Figure 10:
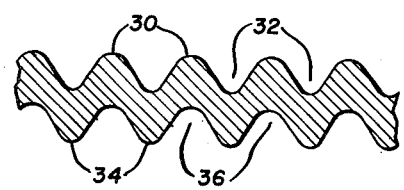
Figure 10 is a view similar to Figure 8 but the depth of the corrugations are shallower.
Figure 11:
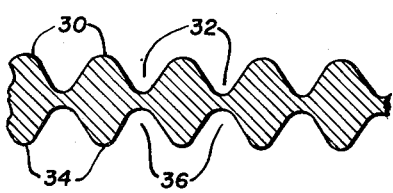
Figure 11 is a view similar to Figure 9 but the depth of the corrugations are shallower.
Figure 12:
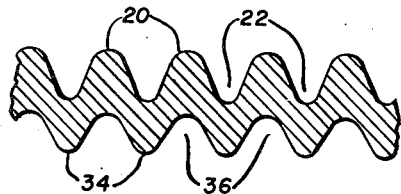
Figure 12 is a view showing a combination of Figures 8 and 10 in that the top corrugations are the same as those shown in Figure 8 and the bottom corrugations are the same as those shown in Figure 10.
Figure 13:
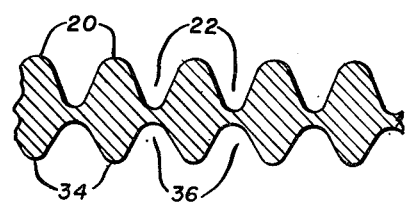
Figure 13 is a view of a combination of Figures 9 and 11 in that the top corrugations are the same as those shown in Figure 9 and the bottom corrugations are the same as those shown in Figure 11.

In Figure 7, the modified form is illustrated in that the ridges 20 on one side of the potato product are 180 degrees out-of-phase alignment with the grooves 26 on the opposite sides of the potato product. This is illustrated by the enlarged view in Figure 9. Figures 8 and 9 show deep grooves 22 and 26 whereas the Figures 10 and 11 show shallow grooves 32 and 36 making the ridges 30 and 34 less in heighth than those shown in Figures 8 and 9. The Figure 12 shows one side of the product with deep grooves 22 and on the other side of the product shallow grooves 36. In Figure 13 one side of the product has deep grooves 22 and the other side of the potato product has shallow grooves 36.

In order to obtain the distinctive and crunchy taste which results from the slicing dimensions and shape of the product, the applicant finds that the inclined sides of the grooves should be less than 90 degrees and preferably lie in a range of 30 degrees to 90 degrees. The range for the radius curvature at the top of the ridges preferably has a minimum value not less than .005 inch and a maximum value less than substantially one-half of the pitch being the distance measured between the top of one ridge to the top of an adjacent ridge. The range of the radius curvature for the bottom of the grooves is preferably less than the range of the curvature for the top of the ridges by an amount ranging from .005 to .030 inch. The depth of the grooves measured from the top of the ridges to the bottom of the grooves preferably lie in a range from approximately .020 to .080 inch. The pitch of the corrugations measured from the top of one ridge to the next adjacent ridge preferably lies in a range from approximately 5 to 12 per inch. The thickness of the web 18 between the bottom of the grooves is preferably in a range from .002 to .060 inch.

It has been found that a potato product cut within the limits of the above specified dimensions and cooked in a cooking medium gives a distinctive taste and a crunchiness different from Saratoga potato chips, wave, or marcel potato chips, potato shoe string, or french fried potatoes. As shown in Figure 5, the product may have a series of holes 40 extending therethrough in order to aid the cooking.

The applicant is unable to explain why the potato product cut within the above dimensions has a distinctive and crunchy taste different from other potato products but it is believed that one reason therefore might be that the potato product is bruised while cutting and this might be the source of the different taste and the crunchy structure of the final product.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A sliced potato product having a centrally disposed web with first and second opposed faces, a first set of ridges extending across said first face of said web in substantially parallel arcuate paths, a second set of ridges extending across said second face of said web in substantially parallel arcuate paths, said first set of ridges having divergingly disposed side walls having an angle therebetween lying in a range from 30 to 90 degrees, said side walls terminating in a widened base at said first face of the web with said side walls of the first set of ridges defining a first set of grooves having bottom surfaces meeting with the first face of said centrally disposed web, said second set of ridges having divergingly disposed side walls having an angle therebetween lying in a range from 30 to 90 degrees, said side walls terminating in a widened base at said second face of the web with said side walls of the second set of ridges defining a second set of grooves having bottom surfaces meeting with the second face of said centrally disposed web, the thickness of the web lying in a range between .002 to .060 inch, the number of ridges lying in a range from 5 to 12 per inch, the height of the ridges from the top thereof to the bottom of the valleys lying in a range from .020 to .080 inch.

2. A sliced potato product having a centrally disposed web with first and second opposed faces, a first set of ridges extending across said first face of said web in substantially parallel arcuate paths, a second set of ridges extending across said second face of said web in substantially parallel arcuate paths, said first set of ridges having divergingly disposed side walls having an angle therebetween lying in a range from 30 to 90 degrees, said side walls terminating in a widened base at said first face of the web with said side walls of the first set of ridges defining a first set of grooves having bottom surfaces meeting with the first face of said centrally disposed web, said second set of ridges having divergingly disposed side walls having an angle therebetween lying in a range from 30 to 90 degrees, said side walls terminating in a widened base at said second face of the web with said side walls of the second set of ridges defining a second set of grooves having bottom surfaces meeting with the second face of said centrally disposed web, the thickness of the web lying in a range between .002 to .060 inch, the number of ridges lying in a range from 5 to 12 per inch, the height of the ridges from the top thereof to the bottom of the valleys lying in a range from .020 to .080 inch, said first and second set of ridges on opposite sides of the web being cross-cross with respect to each other.

3. A sliced potato product having a centrally disposed web with first and second opposed faces, a first set of ridges extending across said first face of said web in substantially parallel arcuate paths, a second set of ridges extending across said second face of said web in substantially parallel arcuate paths, said first set of ridges having divergingly disposed side walls having an angle therebetween lying in a range from 30 to 90 degrees, said side walls terminating in a widened base at said first face of the web with said side walls of the first set of ridges defining a first set of grooves having bottom surfaces meeting with the first face of said centrally disposed web, said second set of ridges having divergingly disposed side walls having an angle therebetween lying in a range from 30 to 90 degrees, said side walls terminating in a widened base at said second face of the web with said side walls of the second set of ridges defining a second set of grooves having bottom surfaces meeting with the second face of said centrally disposed web, the thickness of the web lying in a range between .002 to .060 inch, the number of ridges lying in a range from 5 to 12 per inch, the height of the ridges from the top thereof to the bottom of the valleys lying in a range from .020 to .080 inch, said first and second set of ridges on opposite sides of the web being substantially parallel with respect to each other and having a range of alignment with respect to each other on the opposite side of the web varying from in-phase alignment to 180 degrees out-of-phase alignment.

References Cited in the file of this patent

UNITED STATES PATENTS

| | | |
|---|---|---|
| 678,514 | Regnier | July 16, 1901 |
| 1,676,160 | Ruffner | July 3, 1928 |
| 2,612,453 | Stahmer | Sept. 30, 1952 |